HICKS & SHAWK.
Improvement in Telegraph-Sounders.
No. 130,048.  Patented July 30, 1872.
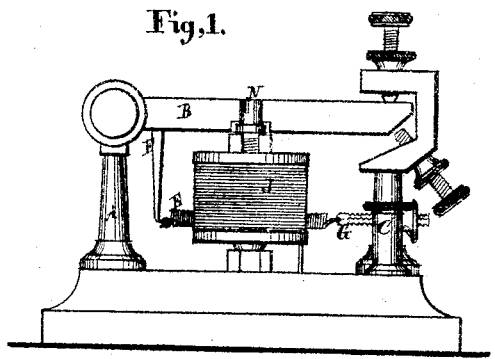
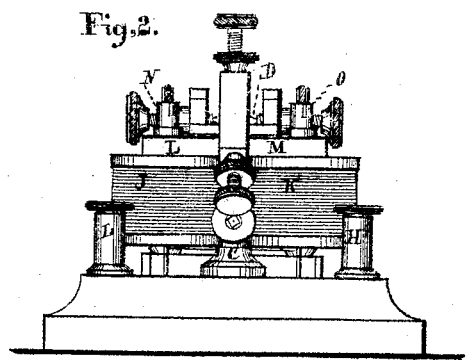
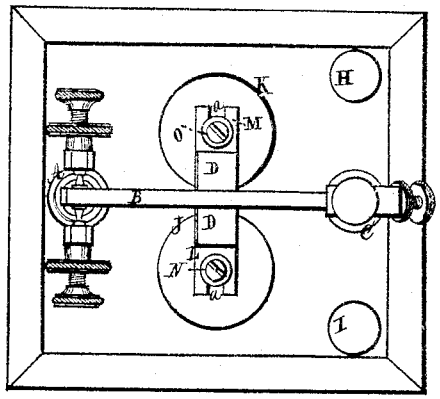

UNITED STATES PATENT OFFICE.

GEORGE B. HICKS AND GEORGE W. SHAWK, OF CLEVELAND, OHIO.

IMPROVEMENT IN TELEGRAPH-SOUNDERS.

Specification forming part of Letters Patent No. 130,048, dated July 30, 1872.

*To all whom it may concern:*

Be it known that we, GEORGE B. HICKS and GEORGE W. SHAWK, of Cleveland, in the county of Cuyahoga and State of Ohio, have invented a certain new and Improved Sounder or Telegraph Instrument; and we do hereby declare that the following is a full, clear, and complete description thereof, reference being had to the accompanying drawing making part of the same.

SPECIFICATION.

Figure 1 is a side view; Fig. 2, an end view; Fig. 3, a top view.

Like letters of reference refer to like parts in the several views.

The nature of this invention relates to one or more adjustable pole-pieces in connection with one or more magnets and armatures in sounders or telegraph instruments, for the purpose of obtaining the maximum or greater amount of magnetic effect from the instrument by a given amount of battery force and length of line, as hereinafter more fully described.

In the drawing, A is the armature-post, as seen in Fig. 1; B, the armature-lever, which is pivoted to the post A upon points or pivots in the ordinary way; C, the adjusting-post for the armature-lever; D, the armature, as shown in Figs. 2 and 3. E is an adjusting or tension spring, which is connected to the lever B by the arm F. The other end of the said spring is attached to an adjusting-screw, G, provided with a thumb-nut, in the usual way. H I are the binding-posts, for connecting the battery to the instrument by the ordinary means. J and K are the magnets of coiled wire, the cases of which are bored out through their centers. The object of boring out the said cases is to increase the capacity to receive and discharge the magnetism rapidly, and to lessen its ability to retain residual magnetism. On the end of each magnet is connected an adjustable pole-piece, which are seen at L M, Figs. 2 and 3. Each pole-piece is connected with one of the magnets by means of a set-screw, as at N and O. In each of the pole-pieces is a slot, *a*, through which passes a set-screw, and screws into the core of the magnet. These slots *a* admit of the pole-pieces being moved to or from each other, as the nature of the case may require, and as hereinafter described. The pole-pieces extend from the magnets under the armature, and which pole-pieces may be of the same capacity with respect to their diameter as the magnet-cores, and the same may be the case with the armature were it not that the armature is required to move rapidly.

The object of the adjustable pole-pieces is to obtain the greatest amount of force for the instrument that can be obtained from a given amount of battery-power. This maximum of force is attained by moving the pole-pieces laterally. Supposing the pole-pieces to be in contact directly under the armature, there would then be no avoidable movement of the lever B. Now, by moving the said pole-pieces from each other laterally, the energy of the instrument will increase up to a certain point, where the maximum of strength is obtained, and by moving the said pole-pieces still further apart laterally the force will decrease until it is unavailable. Thus by moving these pole-pieces laterally to or from each other the maximum power of the battery can be obtained for the instrument. This point of obtaining the greatest amount of battery-force is determined by moving the said pole-pieces, as before stated. This point may vary in different instruments and batteries and the length of the circuit; the pole-pieces may be readily moved and adjusted to such conditions and secured in place upon the magnets by the set-screws.

Instruments thus constructed may be easily adapted to any length of circuit or amount of battery, and by this improvement a greater power can be obtained from less battery and a smaller instrument over a given length of line than can be generated in the ordinary way.

Claim.

What we claim as our invention, and desire to secure by Letters Patent, is—

In telegraph sounders or relays, the combination of one or more adjustable pole-pieces with one or more magnets, substantially as and for the purpose set forth.

GEORGE B. HICKS.
GEO. W. SHAWK.

Witnesses:
J. H. BURRIDGE,
W. H. BURRIDGE.